United States Patent
Kwentus et al.

(10) Patent No.: US 7,254,190 B2
(45) Date of Patent: Aug. 7, 2007

(54) SATELLITE RECEIVER

(75) Inventors: Alan Kwentus, San Juan Capistrano, CA (US); Steven T. Jaffe, Irvine, CA (US); Tarek Kaylani, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 551 days.

(21) Appl. No.: 09/946,165

(22) Filed: Sep. 4, 2001

(65) Prior Publication Data

US 2002/0122511 A1 Sep. 5, 2002

Related U.S. Application Data

(60) Provisional application No. 60/230,045, filed on Sep. 1, 2000.

(51) Int. Cl.
*H04L 27/06* (2006.01)
(52) U.S. Cl. .................. 375/340; 375/341; 375/262; 375/373
(58) Field of Classification Search ............... 375/240, 375/254, 262, 265, 285, 326, 341, 373, 375; 341/51, 52
See application file for complete search history.

(56) References Cited

U.S. PATENT DOCUMENTS

| | | | |
|---|---|---|---|
| 4,677,625 A | 6/1987 | Betts et al. | |
| 4,677,626 A | 6/1987 | Betts et al. | |
| 4,979,175 A | 12/1990 | Porter | |
| 5,181,209 A | 1/1993 | Hagenauer et al. | |
| 5,406,570 A | 4/1995 | Berrou et al. | |
| 5,446,747 A | 8/1995 | Berrou | |
| 5,555,247 A | 9/1996 | Matsuoka et al. | |
| 5,563,897 A | 10/1996 | Pyndiah et al. | |
| 5,666,378 A | 9/1997 | Marchetto et al. | |
| 5,675,585 A | 10/1997 | Bonnot et al. | |
| 5,703,911 A | 12/1997 | Lin et al. | |
| 5,721,745 A | 2/1998 | Hladik et al. | |
| 5,734,962 A | 3/1998 | Hladik et al. | |
| 5,742,612 A | 4/1998 | Gourgue et al. | |
| 5,761,248 A | 6/1998 | Hagenauer et al. | |
| 5,784,300 A | 7/1998 | Neumeier et al. | |

(Continued)

FOREIGN PATENT DOCUMENTS

EP 0 368 189 A2 5/1990

(Continued)

OTHER PUBLICATIONS

Berrou, Claude, "Near Optimum Error Correcting Coding and Decoding: Turbo-Codes," *IEEE Transactions on Communications*, Oct. 1996, pp. 1261-1271, vol. 44, No. 10.

(Continued)

*Primary Examiner*—Dac V. Ha
(74) *Attorney, Agent, or Firm*—Sterne, Kessler, Goldstein & Fox PLLC

(57) ABSTRACT

Systems and techniques for receiving a satellite signal wherein the signal is demodulated and iterative decoded. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

42 Claims, 8 Drawing Sheets

U.S. PATENT DOCUMENTS

| | | | |
|---|---|---|---|
| 5,815,541 A * | 9/1998 | Fukushi | 375/376 |
| 5,841,818 A | 11/1998 | Lin et al. | |
| 5,862,175 A * | 1/1999 | Sugiyama et al. | 375/219 |
| 5,907,582 A | 5/1999 | Yi | |
| 5,909,471 A * | 6/1999 | Yun | 375/343 |
| 5,933,462 A | 8/1999 | Viterbi et al. | |
| 5,970,085 A | 10/1999 | Yi | |
| 5,978,365 A | 11/1999 | Yi | |
| 5,983,383 A * | 11/1999 | Wolf | 714/755 |
| 5,983,384 A | 11/1999 | Ross | |
| 5,983,385 A | 11/1999 | Khayrallah et al. | |
| 5,996,104 A | 11/1999 | Herzberg | |
| 6,016,568 A | 1/2000 | Wolf et al. | |
| 6,182,261 B1 | 1/2001 | Haller et al. | |
| 6,366,326 B1 * | 4/2002 | Ozkan et al. | 348/558 |
| 6,711,225 B1 * | 3/2004 | Sutardja et al. | 375/364 |
| 6,842,495 B1 * | 1/2005 | Jaffe et al. | 375/326 |
| 6,885,710 B1 * | 4/2005 | Park et al. | 375/340 |
| 6,897,791 B2 * | 5/2005 | Jaffe et al. | 341/50 |
| 6,959,050 B2 * | 10/2005 | Baum et al. | 375/326 |
| 2001/0028690 A1 | 10/2001 | Ebel, Sr. | |

FOREIGN PATENT DOCUMENTS

| | | |
|---|---|---|
| EP | 0891656 B1 | 9/1999 |
| EP | 0940957 A1 | 9/1999 |
| EP | 0 973 292 A2 | 1/2000 |
| EP | 0 973 292 A3 | 1/2000 |
| EP | 0973292 A2 | 1/2000 |
| EP | 0986181 A2 | 3/2000 |
| EP | 1030457 A2 | 8/2000 |
| FR | 2 724 522 A1 | 3/1996 |
| FR | 2724522 A1 | 3/1996 |
| GB | 2346782 A | 8/2000 |
| WO | WO-99/19994 A2 | 4/1999 |
| WO | WO-01/43310 A2 | 6/2001 |
| WO | WO-01/43384 A2 | 6/2001 |
| WO | WO 02/19552 A2 | 3/2002 |
| WO | WO-02/21702 A1 | 3/2002 |
| WO | WO-02/23738 A2 | 3/2002 |
| WO | WO-02/23739 A2 | 3/2002 |
| WO | WO 02/37691 A2 | 5/2002 |

OTHER PUBLICATIONS

Pietrobon, Steven S., "Implementation and Performance of a Turbo/MAP Decoder," a paper submitted to the *International Journal of Satellite Communications*, Feb. 21, 1997, rev. Dec. 4, 1997 and Apr. 2, 1998, 45 pages.

Robertson, Patrick, et al., "Bandwidth-Efficient Turbo Trellis-Coded Modulation Using Punctured Component Codes," *IEEE Journal on Selected Areas in Communications*, Feb. 1998, pp. 206-218, vol. 16, No. 2.

Viterbi, Andrew J., "An Intuitive Justification and a Simplified Implementation of the MAP Decoder for Convolutional Codes," *IEEE Journal on Selected Areas in Communications*, Feb. 1998, pp. 260-264, vol. 16, No. 2.

Hsu, Jah-Ming, et al., "A Parallel Decoding Scheme for Turbo Codes," *ISCAS '98. Proceedings of the 1998 IEEE International Symposium on Circuits and Systems*, Monterey, CA, May 31, 1998, pp. 445-448.

Gross, W.J., et al., "Simplified MAP Algorithm Suitable for Implementation of Turbo Decoders," *Electronics Letters*, Aug. 6, 1998, pp. 1577-1578, vol. 34, No. 16.

Yue, Chung-Wai, et al., "On the FER Performance and Decoding Complexity of Turbo Codes," *1999 IEEE 49th Vehicular Technology Conference*, Houston, TX, May 16, 1999, pp. 2214-2218.

Schurgers, Curt, et al., "Energy Efficient Data Transfer and Storage Organization for a MAP Turbo Decoder Module," *Proceedings 1999 International Symposium on Low Power Electronics and Design*, New York, NY, Aug. 16-17, 1999, pp. 76-81.

Langlais, Charlotte, et al., "Synchronisation in the Carrier Recovery of a Satellite Link Using Turbo-Codes with the Help of Tentative Decisions," *IEE Colloquium. Turbo Codes in Digital Broadcasting—Could It Double Capacity?*, Nov. 22, 1999, pp. 5/1-7.

Kim, Bonghoe, et al., "Reduction of the Number of Iterations in Turbo Decoding Using Extrinsic Information," *IEEE Tencon*, 1999, pp. 494-497.

Richardson, Tom, "The Geometry of Turbo-Decoding Dynamics," *IEEE Transactions on Information Theory*, Jan. 2000, pp. 9-23, vol. 46, No. 1.

Morlet, Catherine, et al., "A Carrier Phase Estimator for Multimedia Satellite Payloads Suited to RSC Coding Schemes," *IEEE Conference on Communications, Proceedings of IEEE International Conference on Communications*, New Orleans, LA, Jun. 18-22, 2000, pp. 455-459, vol. 1.

Collins, Oliver M., et al., "Iterative Decoding of Non-Systematic Turbo-Codes," *2000 IEEE International Symposium on Information Theory*, Sorrento, Italy, Jun. 25-30, 2000, p. 172.

Proakis, J. G., *Digital Communications*, 1991, pp. 234-271, McGraw-Hill, New York, XP-002193198.

Schlegel, Christian, *Trellis Coding*, 1997, IEEE Press, Piscataway, New Jersey (entire book).

Heegard, Chris, et al., *Turbo Coding*, 1999, Kluwer Academic Publishers, Norwell, Massachusetts (entire book).

Vucetic, Branka, et al., *Turbo Codes Principles and Applications*, 2000, Kluwer Academic Publishers, Norwell, Massachusetts (entire book).

Sklar, Bernard, *Digital Communications Fundamentals and Applications*, Second Edition, 2001, Prentice Hall PTR, Upper Saddle River, New Jersey (entire book).

Catherine Morlet, et al., *A Carrier Phase Estimator For Multi-Media Satellite Payloads Suited To RSC Coding Schemes*, 2000 IEEE, pp. 455-459.

J.G. Proakis, Digital Communications, 1991 McGraw-Hill, pp. 234-271.

PCT International Search Report, No. PCT/US01/42010, Jun. 30, 2003.

Benedetto, S., et al., "Parallel Concatenated Trellis Coded Modulation," Jet Propulsion Laboratory, California Institute of Technology, 5 pages; 1996.

Ramsey, John L., "Realization of Optimum Interleavers," *IEEE Transactions on Information Theory*, May 1970, pp. 338-345, vol. IT-16, No. 3.

Ungerboeck, Gottfried, "Channel Coding with Multilevel/Phase Signals," *IEEE Transactions on Information Theory*, Jan. 1982, pp. 55-66, vol. IT-28, No. 1.

Battail, Gérard, et al., "Suboptimum Decoding Using Kullback Principle," in *Lecture Notes in Computer Science*, 1988, pp. 93-101, No. 313, B. Bouchon et al. Eds.

Berrou, Claude, et al., "Near Shannon Limit Error—Correcting Coding and Decoding: Turbo-Codes," *IEEE International Conference on Communications '93*, Geneva Switzerland, May 23, 1993, pp. 1064-1070, Technical Program, Conference Record, vol. 2/3.

Moher, Michael, "Decoding Via Cross-Entropy Minimization," *Proceedings IEEE GLOBECOM Conference*, Houston, TX, Dec. 1993, pp. 809-813.

Donlinar, S., et al., "Weight Distributions for Turbo Codes Using Random and Nonrandom Permutations," TDA Progress Report 42-122, Jet Propulsion Laboratory, Aug. 1995, pp. 56-65.

Fazel, K., et al., "Combined Multilevel Turbo-Code with 8PSK Modulation," *Global Telecommunications Conference, 1995. Conference Record. Communication Theory Mini-Conference, GLOBECOM '95*. IEEE Singapore, Nov. 13, 1995, pp. 649-653.

Divsalar, D., et al., "Effective Free Distance of Turbo Codes," *Electronics Letters*, Feb. 29, 1996, pp. 445-446, vol. 32, No. 5.

Hagenauer, Joachim, et al., "Iterative Decoding of Binary Block and Convolutional Codes," *IEEE Transactions on Information Theory*, Mar. 1996, pp. 429-445, vol. 42, No. 2.

* cited by examiner

SATELLITE RECEIVER

CROSS REFERENCE TO RELATED APPLICATIONS

The present application claims priority under U.S.C. § 119(e) to provisional Application No. 60/230,045, filed Sep. 1, 2000, which is expressly incorporated herein by reference as though fully set forth in full.

BACKGROUND

1. Field

The present invention relates to communications systems, and more particularly, to systems and techniques for recovering modulated signals in a wireless communications system.

2. Background

In recent years, transmission of data via satellite has increased considerably. Recently, the number of personal satellite receivers have also been increasing. As large satellite receiving antennas and expensive receivers are replaced by smaller and less expensive equipment, the demand for such systems continues to rise. As the demand for satellite communication systems rises, systems which have increased performance have a distinct market advantage. Improving designs and increasing the level of system integration within satellite receivers can offer the dual benefits of decreasing system costs and increasing performance. Accordingly, there is a need for improved satellite receivers within the art.

SUMMARY

In one aspect of the present invention, a satellite receiver includes a demodulator, and a iterative decoder coupled to the demodulator.

In another aspect of the present invention, a method of receiving a modulated concatenated signal includes demodulating the signal, and iterative decoding the signal.

In one aspect of the present invention, a satellite receiver includes a demodulator, and an iterative decoder coupled to the demodulator.

In a further aspect of the present invention, a method of correlation includes computing a difference in phase between adjacent symbols in a first symbol sequence to produce a plurality of differential symbols, and correlating the differential symbols with a second symbol sequence.

In yet a further aspect of the present invention, a differential correlator includes a differential symbol generator configured to compute a difference in phase between adjacent symbols in a first symbol sequence to produce a plurality of differential symbols, and a correlator configured to correlate the differential symbols with a second symbol sequence.

In another aspect of the present invention, a differential correlator includes computing means for computing a difference in phase between between adjacent symbols of a first symbol sequence to produce a plurality of differential symbols, and correlation means for correlating the differential symbols with a second symbol sequence.

In yet another aspect of the present invention, a method of correlating a first symbol sequence with a second symbol sequence includes sequentially convolving each of the symbols of the first symbol sequence with one of the symbols of the second symbol sequence to produce a plurality of sequential convolved values, and accumulating the convolved values.

In a further aspect of the present invention, a serial correlator includes a multiplier configured to sequentially convolve each symbol of a first symbol sequence with a symbol from a second symbol sequence to produce a plurality of convolved values, and an accumulator configured to accumulate the sequentially convolved values.

In yet a further aspect of the present invention, a serial correlator includes convolution means for sequentially convolving each symbol of a first symbol sequence with a symbol from a second symbol sequence to produce a plurality of convolved values, and accumulation means for accumulating the sequentially convolved values.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings in which like reference numerals refer to similar elements.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Exemplary embodiments of a satellite receiver accepts modulated data and generates demodulated, error-corrected data. The data can be text, video, audio, or any other type of information and data. The described exemplary embodiments can be adapted for any number of applications, including by way of example, home set-top boxes, cable television head ends, local television stations, local network service providers, or any other type of satellite communications system. In at least one embodiment of a satellite receiver, acquisition and tracking loops are integrated with demodulation and decoding functionality on a single integrated circuit chip. Other embodiments contemplate implementing certain functionality off-chip. Alternatively, the satellite receiver can be implemented with discrete components or any other conventional technology known in the art. Whether such embodiments are implemented on a single integrated circuit chip will depend upon a variety of factors including the particular communications application and the design constraints imposed on the overall system. Skilled artisans may implement the satellite receiver in varying ways for each particular application, but such implementation decisions should not be interpreted as causing a departure from the scope of the present invention.

Figure 1:
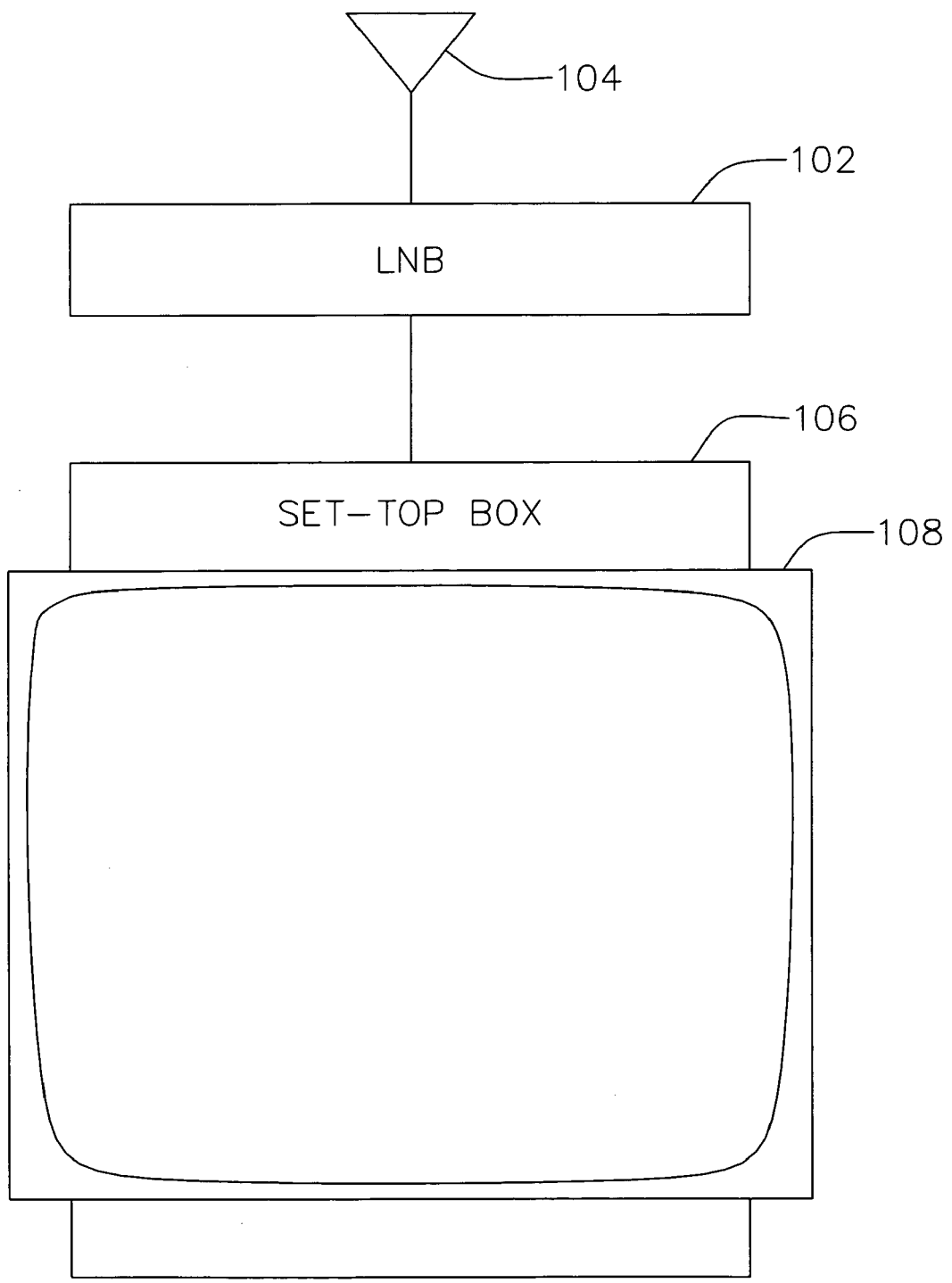
FIG. 1 is a generalized block diagram of a communications system employing an exemplary satellite receiver in a set-top box.

A generalized block diagram of a communications system employing an exemplary satellite receiver in a set-top box is depicted in FIG. 1. The communications system includes a Low Noise Block Downconverter (LNB) 102 for use in a Direct Broadcast Satellite (DBS) television system. An antenna or satellite dish 104 is configured to receive a satellite transmission. The satellite transmission received by the antenna 104 is coupled to the LNB 102 mounted to the antenna 104. The LNB 102 downconverts the satellite transmission to an intermediate frequency (IF), by way of example, 950 to 2150 MHz. The LNB 102 may include any number of amplifier stages and filters to provide an IF signal with increased gain and reduced front end noise to a set-top box 106 for a television receiver 108 inside a home.

Figure 2:
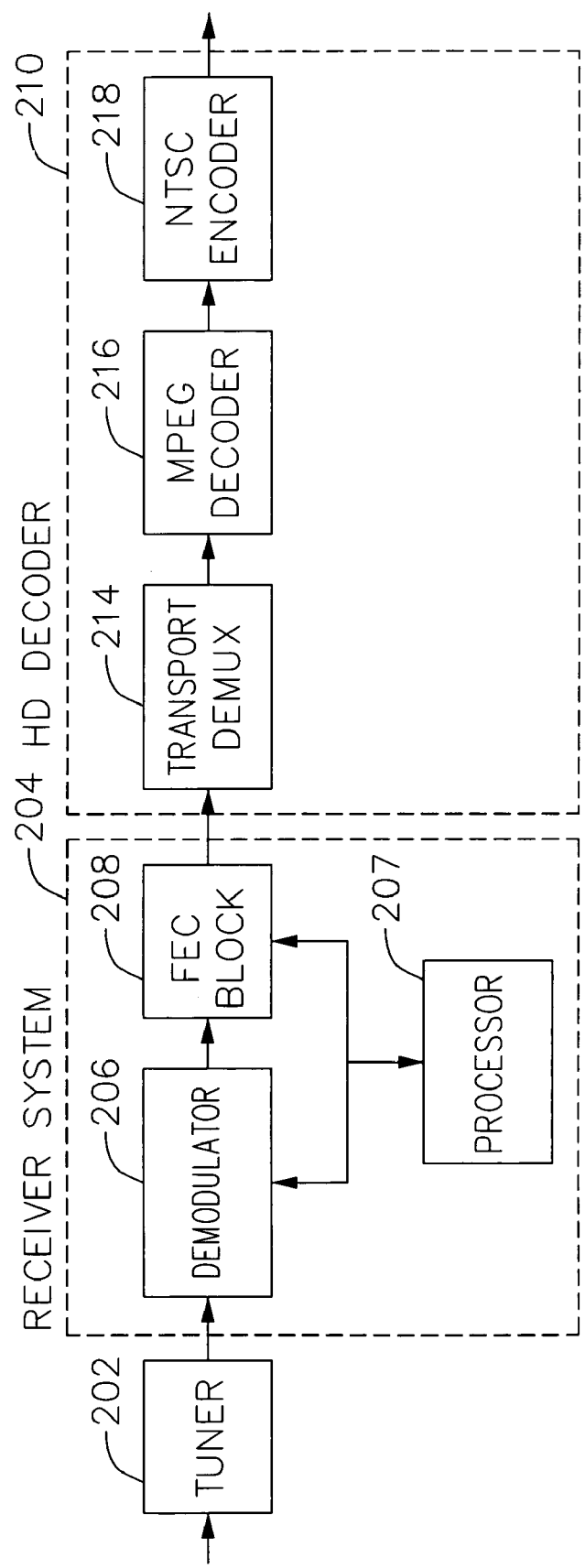
FIG. 2 is a functional block diagram of an exemplary set-top box.

A functional block diagram of an exemplary set-top box is shown in FIG. 2. The set-top box includes a front end tuner 202 for tuning a desired frequency band or channel. In the described exemplary embodiment, the tuner also downconverts the IF signal in the selected frequency band to a baseband signal by mixing the IF signal with a local oscillator (LO). The baseband signal from the tuner 202 can be coupled to a satellite receiver 204. The satellite receiver 204 includes a demodulator 206 to demodulate the baseband signal. The demodulator 206 may be configured to operate with a variety of signal modulation schemes. By way of example, exemplary embodiments of the demodulator 206 may support BPSK (Binary Phase Shift Keying), QPSK (Quadrature Phase Shift Keying), 8 PSK (Eight Phase Shift Keying), 16 QAM (Quadrature Amplitude Modulation), Frequency Shift Keying (FSK), and numerous other modulation schemes known in the art. The demodulator 206 can support a fixed modulation scheme or, alternatively, be adaptively switched between any number of modulation schemes to best accommodate changing environmental conditions and other system parameters.

The modulation scheme supported by the demodulator 206 may be controlled by a processor 207. The processor 207 may cooperate with the demodulator 206 to determine the type of modulation present. By way of example, the processor 207 may program the demodulator 206 to sequentially cycle through a number of different modulation schemes to find the appropriate one. Alternately, the processor 207 may be programmed, beforehand, with the modulation scheme associated with a particular frequency band. With this approach, if the processor 207 also controls the tuner 202, the processor 207 can readily set the demodulator 206 appropriately based on the tuner frequency. As will be described in greater detail below, the processor 207 can also cooperate with the demodulator 206 to facilitate channel acquisition and tracking.

The demodulated baseband signal from the demodulator 206 can be coupled to a forward error correction (FEC) block 208. The FEC block 208 may be implemented in a variety of ways and employ any number of coding algorithms depending upon the overall design constraints of the communications system and the specific application. The processor 207 can be used to select the appropriate coding algorithm. In the described exemplary communications system, the satellite transmission utilizes parallel or serial concatenated codes. Concatenated codes provide a robust methodology for correcting data corrupted by noise, interference, and other environmental conditions due to its ability to operate at lower signal-to-noise ratios than may be possible with other coding algorithms.

The demodulated, error corrected output from the satellite receiver 204 is delivered to a High Definition (HD) Decoder 210. The satellite receiver 204 output can be a standard MPEG-2 (Motion Picture Experts Group) format, or any other format known in the art. In the MPEG-2 format, the output of the satellite receiver 204 can be a serial or parallel transport stream. Alternatively, the satellite receiver 204 can deliver both a parallel and serial MPEG-2 transport stream to the HD Decoder. An exemplary HD Decoder is disclosed in U.S. application Ser. No. 09/641,734, filed Aug. 18, 2000, entitled "Video, Audio, and Graphics Decode, Composite and Display System," commonly owned by the Assignee of the present invention, the entire disclosure of which is expressly incorporated herein by reference.

The HD Decoder 210 includes a transport demultiplexer 214 to convert a serial transport stream of video, audio and data into a parallel transport stream. The parallel transport stream from the transport demultiplexer 214 can be coupled to a MPEG-2 decoder 216. The MPEG-2 decoder 216 recreates video, audio and data streams using MPEG-2 decoder algorithms well known in the art. The output of the MPEG-2 decoder 216 can be coupled to an NTSC (National Television Standards Committee) encoder 218 for conversion to an NTSC format. Alternatively, the NTSC encoder 218 can be replaced with a PAL or SECAM encoder depending upon the video format required. Video standards such as NTSC, PAL, and SECAM specify line and field rates and include color information encoding for a television receiver.

Figure 3:
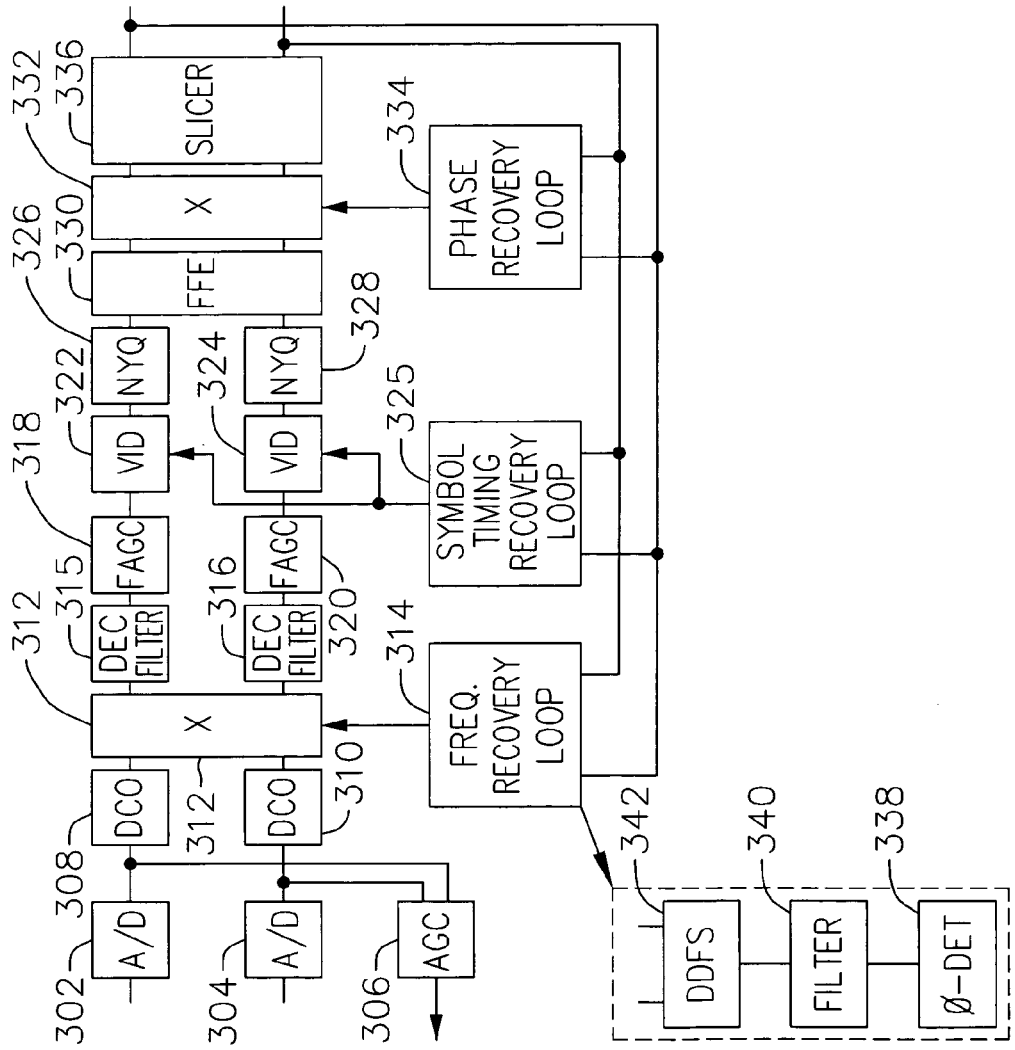
FIG. 3 is a functional block diagram of an exemplary demodulator.

FIG. 3 is a functional block diagram of an exemplary demodulator. In the described exemplary embodiment, the demodulator accepts I (In-phase) and Q (quadrature) signals which are sampled by dual analog-to-digital (A/D) converters 302 and 304 at a sampling rate which is a non-integer multiple of the symbol rate. Optimal loading of the A/D converters 302 and 304 can be achieved with an automatic gain control (AGC) circuit 306. The AGC circuit 306 compares the output power of the digitized I and Q signals from the dual A/D converters 302 and 304 with a gain factor to generate an error signal. The gain factor can be set based on the dynamic range of the dual A/D converters 302 and 304 to maximize resolution. The gain factor can be fixed, or alternatively, programmed into the AGC circuit 306 by the processor 207 (see FIG. 2). The error signal can be used to control a variable gain amplifier (not shown) or variable gain attenuator (not shown) that precedes the dual A/D converters 302 and 304.

The digital baseband signal from the A/D converters can be applied to DC offset cancellation circuits 308 and 310 to remove any residual DC components introduced by the A/D converters 302 and 304. The output of the DC offset cancellation circuits 308 and 310 can be coupled to a complex digital multiplier 312. The complex digital multiplier 312 operates to remove any frequency offset in the baseband signal. In addition, the complex digital multiplier can track changes in frequency due to LO drift in the tuner and LNB under control of a carrier frequency recovery loop 314. Decimation filters 315 and 316 can be used to downsample the digital baseband signal. The decimation filters 315 and 316 can be implemented in variety of fashions, including by way of example, a finite impulse response (FIR) filter. The digital baseband signal output from the decimation filters 315 and 316 can then be applied to Fine AGC (FAGC) circuits 318 and 320. The FAGC circuits 318 and 320 provide signal gain to compensate for the energy removed from the baseband signal by the decimation filters 315 and 316. Variable interpolator decimators (VIDs) 322 and 324 can be used at the output of the FAGC circuits 318 and 320 to resample the digital baseband signal at the correct frequency and phase to extract symbol values from the digital baseband signal. The symbol extraction can be synchronized by a symbol timing recovery loop 325. The extracted symbol values from the VIDs 322 and 324 can then be filtered by square-root Nyquist filters 326 and 328. A feed-forward equalizer (FFE) 330 can be used at the output of the square-root Nyquist filters 326 and 328 to equalize the frequency spectrum. The extracted symbol values output from the square-root Nyquist filters 326 and 328 can be coupled to a complex mixer 332 to provide quick response to residual phase offsets in the baseband signal under control of a phase recovery loop 334.

The symbol values output from the second complex mixer 332 can be coupled to the FEC block (not shown) which will be described in greater detail below. The symbol values can also be coupled to a slicer 336 which generates soft decisions by quantizing the symbol values to the nearest ideal constellation points. The soft decisions from the slicer 336 can then be fed back to the FFE 330 to provide a flat frequency response.

The carrier frequency recovery loop 314 can be used in conjunction with the complex mixer 312 to remove residual frequency offsets in the digital baseband signal and to track change in the frequency due to LO drift in the tuner and LNB. The carrier frequency recovery loop 314 can be implemented with a phase detector 338 configured to detect the phase between the symbol values and the soft decisions output from the slicer 336. The phase detector 338 generates an error signal which represents the angle and direction for frequency offset compensation. The error signal can be filtered by an integral-plus-proportional filter 340 or any other filter known in the art. The filtered error signal can then be coupled to a direct digital frequency synthesizer (DDFS) 342. The DDFS 342 provides frequency conversion for the filtered error signal for the purpose of mixing with the digital baseband signal in the complex digital multiplier 312.

The symbol timing recovery loop 325 produces a symbol clock that is twice the frequency of the digital baseband signal. The symbol clock is adjusted in both frequency and phase such that every other rising edge coincides with the zero crossing point of the digital baseband signal. Once adjusted, the rising edges of the symbol clock immediately following the rising edges coinciding with the zero crossing points can be used to sample the digital baseband signal at a time with minimum interference from successive symbols. The symbol timing recovery loop 325 adjusts the symbol clock to minimize the phase offset between the symbol values and the soft decisions. The symbol clock can be filtered by a digital integral-plus-proportional lowpass filter (not shown) before it is applied to the VIDs 322 and 324.

The phase recovery loop 334 can be used to provide quick response to changes in the phase, which the carrier frequency recovery loop 314 and symbol timing recovery loop 325 may not be able to provide as effectively. In the described exemplary embodiment, the carrier frequency recovery loop 314 and the symbol timing recovery loop 325 are less tightly coupled by having more components within the loop than the phase recovery loop 334.

In the described exemplary embodiment, the processor 207 (see FIG. 2) can control the carrier frequency recovery loop 314, the symbol timing recovery loop 325, the phase recovery loop 334 and the FFE 330. The loops may frozen, programmed or reset by the processor independent of the other loops. The processor can be configured to automatically compute the initial frequency offset for the carrier frequency recovery loop 314 and to initially synchronize the symbol clock to the satellite transmission to improve channel acquisition time. The initial frequency offset can be calculated by utilizing a training sequence embedded in the satellite transmission. The training sequence can also be utilized for symbol clock synchronization. A training sequence is generally a known header or preamble prepended to a payload as defined by a framing protocol for a satellite transmission.

The carrier frequency recovery loop 314 can be used in conjunction with the complex mixer 312 to remove residual frequency offsets in the digital baseband signal and to track change in the frequency due to LO drift in the tuner and LNB. The carrier frequency recovery loop 314 can be implemented with a phase detector 338 configured to detect the phase between the symbol values and the soft decisions output from the slicer 336. The phase detector 338 generates an error signal which represents the angle and direction for frequency offset compensation.

Figure 4:
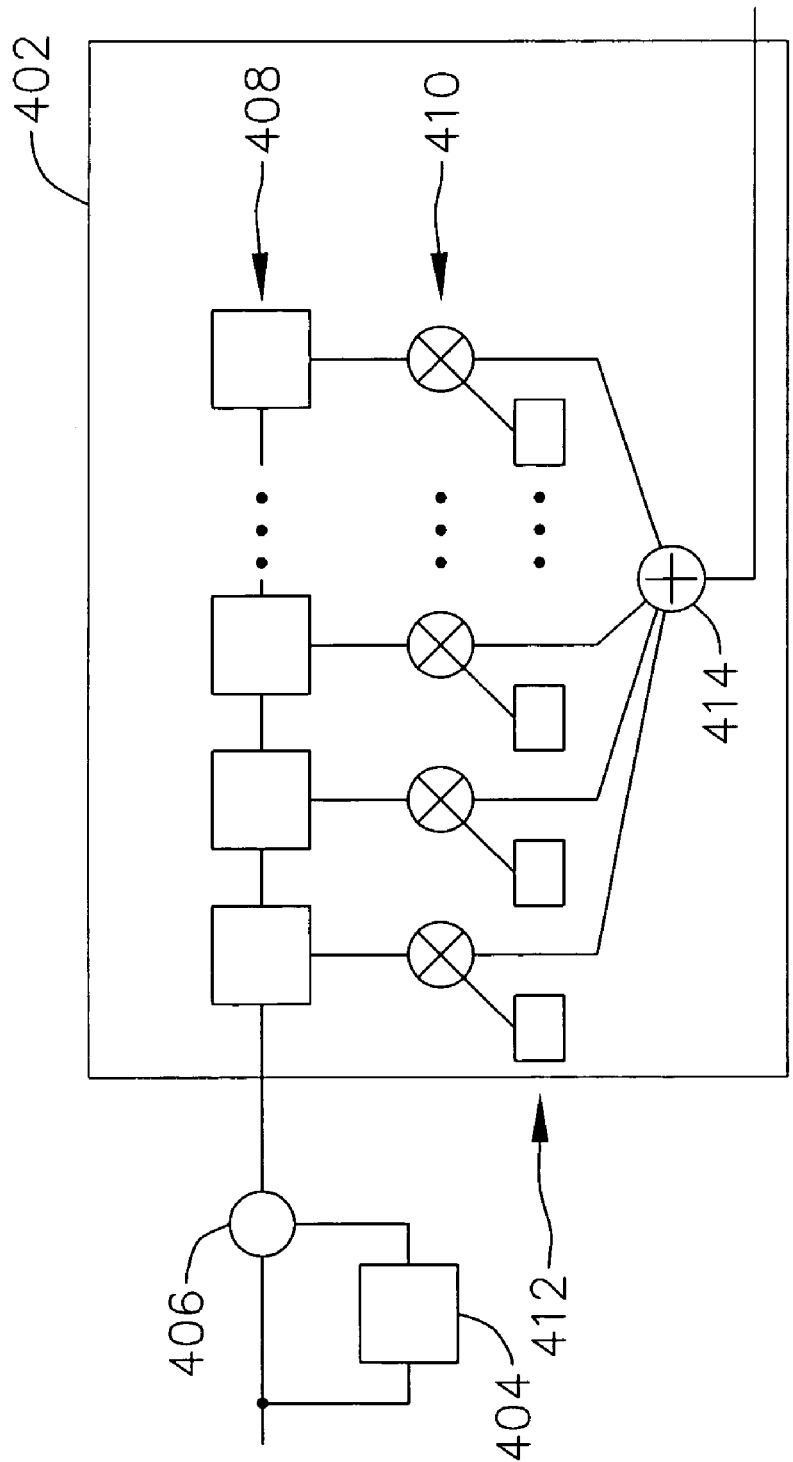
FIG. 4 is a functional block diagram of an exemplary differential correlator.

The frequency offset can be computed and the symbol clock synchronized by using a complex differential correlator as shown in FIG. 4. For ease of explanation, the differential correlator is depicted functionally without reference to separate I and Q channels. The differential correlator 402 operates on the phase differential between successive symbols in the training sequence.

The phase differential between successive symbols can be computed using a differential symbol generator 401. The differential symbol generator 401 may take on various forms without departing from the inventive concepts described throughout. By way of example, the differential symbol generator 401 can be implemented with a delay and conjugate element 404 and a complex multiplier 406. In this embodiment, the symbols from the satellite transmission are fed serially to the delay and conjugate element 404 and the complex multiplier 406. The delay and conjugate element 404 delays the symbols for one symbol clock period such that two successive symbols in the satellite transmission are continuously presented to the complex multiplier 406. The output of the complex multiplier 406 is a vector having a phase angle equal to the differential phase between successive symbols in the satellite transmission.

The output of the complex multiplier 406 is fed into a tapped delay line 408. The tapped delay line 408 can employ delay elements, such as shift registers, arranged in series to temporarily store the serial outputs of the complex multiplier 406 during the computation of the differential correlator. The computation entails convolving the output of each delay element with coefficient tap values in a bank of multipliers 410 (one for each delay element output) as shown in FIG. 4. The coefficients values are the phase differential values between successive symbols in the training sequence stored in memory 412. The outputs of the multipliers are summed in a summation unit 410 to produce a correlation value. A peak correlation value will occur when each delay element output matches its respective coefficient. The processor can then use the phases of the peak correlation values to compute the frequency offset and the distance in time between the peak correlation values to synchronize the symbol clock.

Figure 5:
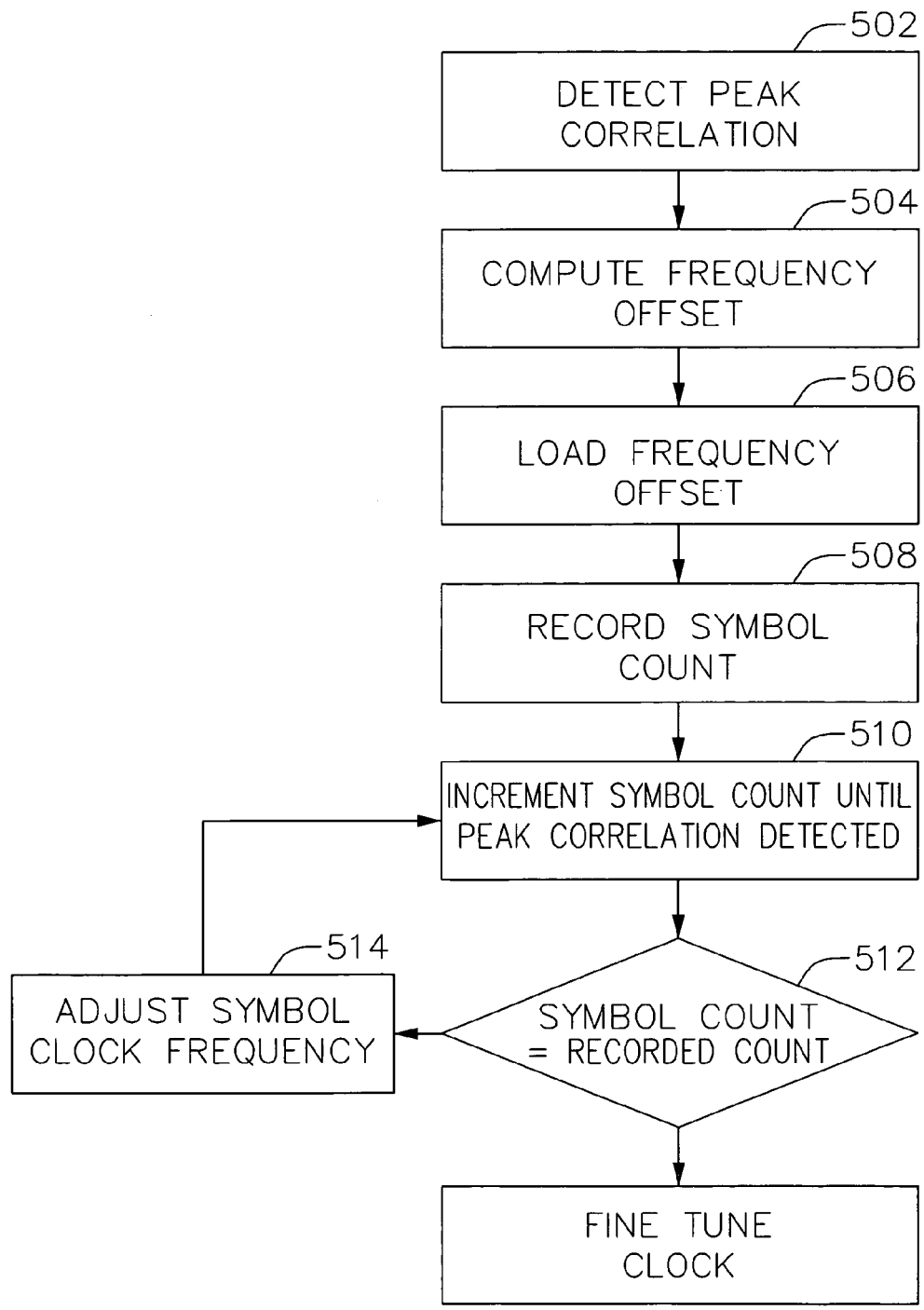
FIG. 5 is a flowchart demonstrating an exemplary methodology for computing the frequency offset of the satellite transmission and synchronizing the symbol clock to the satellite transmission.

FIG. 5 is a flowchart demonstrating an exemplary methodology for computing the frequency offset and synchronizing the symbol clock. In step 502, the processor monitors the output of the differential correlator for a peak correlation value. Once a peak correlation value is detected, the frequency offset is computed in step 504. The frequency offset can be computed by determining the frequency error vector represented by the I and Q components of the peak correlation value. The computed frequency offset can then be loaded into the carrier frequency recovery loop in step 506.

Once the frequency offset is computed, the symbol clock can be synchronized. The symbol clock can be a numerically controlled oscillator or any other adjustable clock known in the art. In at least one exemplary embodiment, the symbol clock can be synchronized with reference to a symbol counter. The symbol counter can be preset so that it will an output pulse when the count reaches the number of symbols in a frame. The output pulse can be used to reset or preload the counter for counting the symbols in the next frame.

In step 508, the symbol count for the peak correlation value is recorded. The symbol count is then incremented by the symbol clock while the processor continues to monitor the output of the differential correlator for the next peak correlation value in step 510. Once the next peak correlation value is detected, the symbol count is compared to the recorded symbol count for the previous peak correlation value in step 512. If the symbol count is not equal to the symbol count for the previous peak correlation value, a frequency adjustment is made to the symbol clock in step 514. The direction of the frequency adjustment is dependent on the symbol count. If the symbol count exceeds the symbol count for the previous peak correlation value, the symbol clock frequency is too high and an adjustment should be made to reduce the frequency of the symbol clock. Conversely, if the symbol count is less than the symbol count of the previous peak correlation value, the symbol clock frequency is too low and an adjustment should be made to increase the frequency of the symbol clock. In at least one embodiment, the processor can determine the magnitude of the frequency adjustment based on the difference between the symbol count and the symbol count for the previous peak correlation value. This process continues until the symbol count is the same for two or more consecutive peak correlation values.

Figure 6:
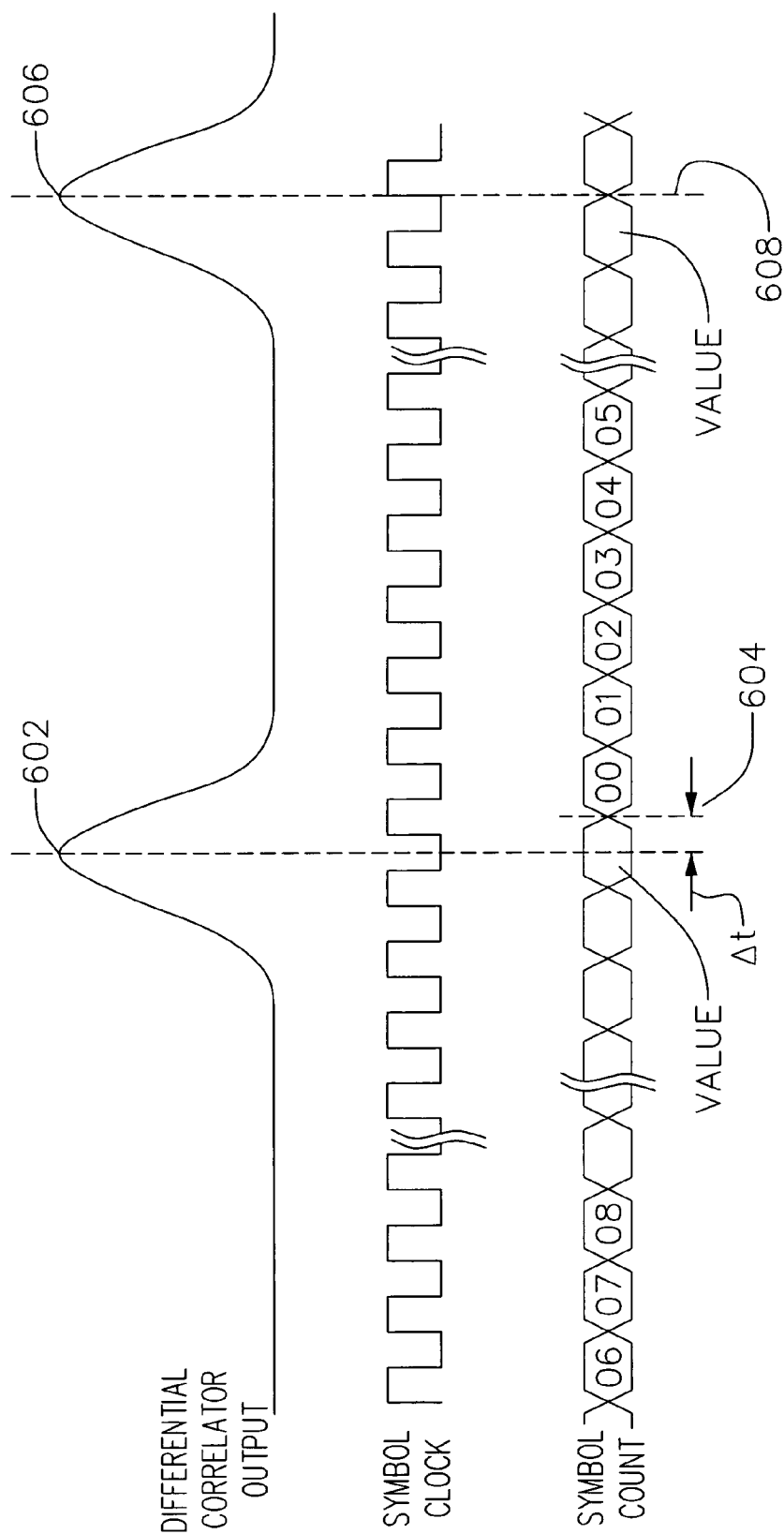
FIG. 6 is a timing diagram illustrating an exemplary process by which the fine frequency adjustment for the symbol clock can be made.

Once the symbol count is the same for two or more consecutive peak correlation values, the symbol clock can be fine tuned in a variety of ways depending on the system parameters and the overall design constraints. By way of example, the symbol timing recovery loop can be utilized to fine tune the symbol clock. Alternatively, the symbol clock can be synchronized by aligning the transition of the symbol counter when it is reset or preloaded with the peak of the correlation value. FIG. 6 is a timing diagram illustrating the exemplary process. For the purposes of illustration, the fine tuning of the symbol clock will be described with a symbol counter that is reset. One can readily see from FIG. 6, that the first peak correlation value 602 precedes, in time, the transition of the symbol count from the value to zero 604 by.t. Since the peak correlation value 602 precedes the transition of the symbol count from the value to zero 604, the frequency of the symbol clock is too low and a fine adjustment should be made to increase the frequency of the symbol clock by a factor relating to t. Conversely, if the transition of the symbol count from the value to zero precedes the first peak correlation value, the frequency of the symbol clock is too high and a fine adjustment should be made to decrease the frequency of the symbol clock. This process should continue for every successive peak correlation value until the peak of the correlation value 606 is time aligned with the transition of the symbol count from the value to zero 608.

Although the differential correlation procedures have been described by sequentially first computing the frequency offset and then synchronizing the symbol clock, those skilled in the art will appreciate that the order may be reversed, or alternatively, the frequency offset computation and symbol synchronization may be performed in parallel. In addition, the sequence of steps for synchronizing the symbol clock may be varied, or some steps even omitted, depending upon the particular application and the overall design constraints. In some instances one or more of the procedures outlined above for synchronizing the symbol clock can be used, either alone or in combination with other known techniques. Alternatively, the entire synchronization process for the symbol clock can be performed by the symbol timing recovery loop by methods known in the art. Those skilled in the art will be readily able to assess the performance tradeoffs to select the optimal symbol clock synchronization process.

Figure 7:
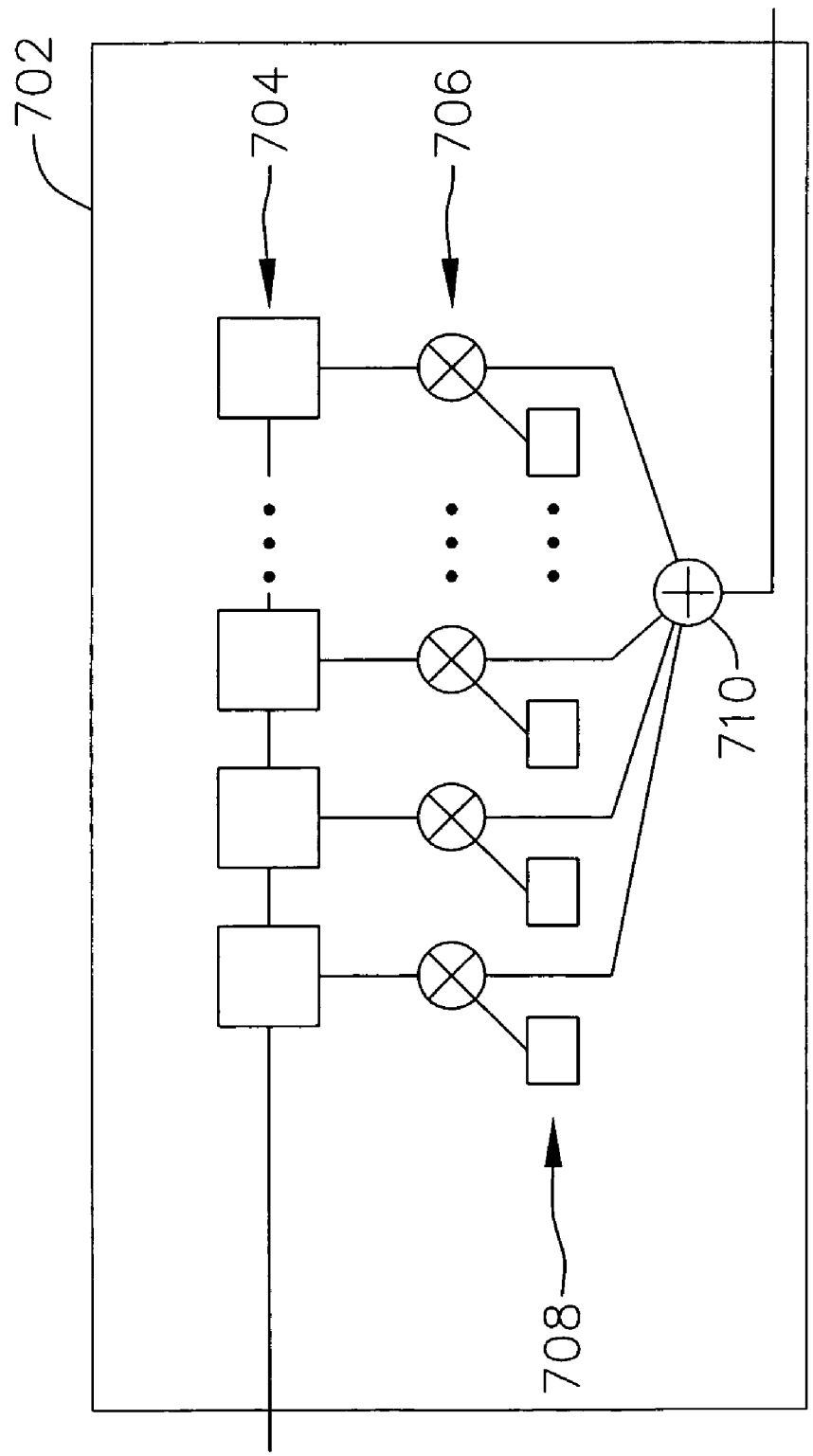
FIG. 7 is a functional block diagram of an exemplary coherent correlator.

Once the frequency offset has been computed and the symbol clock synchronized to the satellite transmission, the carrier phase offset can be computed by the processor and loaded into the phase recovery loop. Because the differential correlator operates on the phase differential between successive symbols of the satellite transmission, the phase information is lost. Accordingly, various other methods should be employed to compute the carrier phase offset. The exact method employed may vary depending on the specific application and the overall design parameters. By way of example, a coherent correlation between the training sequence embedded in the satellite transmission and the training sequence stored in processor memory may be performed to recovery the carrier phase offset. This can be achieved in various fashions including, by way of example, with a parallel complex coherent correlation methodology as shown in FIG. 7. For ease of explanation, the parallel coherent correlator is depicted functionally without reference to separate I and Q channels. The parallel coherent correlator 702 is similar to the differential correlator described in connection with FIG. 4 except that the parallel coherent correlator 702 operates on the actual training sequence rather than the phase differential between successive symbols in the training sequence.

The exemplary parallel coherent correlator 702 includes a tapped delay line 704 configured to receive the serial training sequence embedded in the satellite transmission signal. The tapped delay line 704 can employ delay elements, such as shift registers, arranged in series to temporarily store the serial symbol stream during the computation of the parallel coherent correlator. The output computation entails convolving the output of each delay element with coefficient tap values in a bank of multipliers 706 (one for each delay element output) as shown in FIG. 7. The coefficient values are the training sequence symbols stored in processor memory 708. The outputs of the multipliers are summed in a summation unit 710 to produce a correlation value. A peak correlation value will occur when each delay element output matches its respective coefficient. The processor can then use the phases of the peak correlation values to compute the phase offset.

Figure 8:
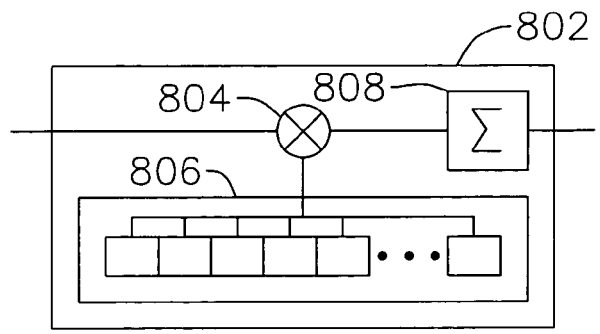
FIG. 8 is a functional block diagram of an alternative exemplary coherent correlator.

An alternative exemplary serial coherent correlator for computing the phase offset is shown in FIG. 8. The exemplary serial coherent correlator 802 eliminates the need for the tapped delay line and instead feeds the serial training sequence embedded in the satellite transmission into a multiplier 804. For each symbol of the training sequence fed to the multiplier 804, the processor retrieves the appropriate coefficient from memory 806 and presents it to the multiplier 804 to weight the respective training sequence symbol. The processor can determine the appropriate coefficient to retrieve from memory by using the symbol count established during the symbol clock synchronization procedures. The symbol count can be used to identify the arrival time of each symbol in the header and payload of the satellite transmission. In this manner, the appropriate coefficients can be retrieved from memory for multiplication with the training sequence symbols. The output of the multiplier 804 can be coupled to an accumulator 808. The accumulator 808 accumulates the weighted training sequence symbols. Once all the weighted training sequence symbols have been accumulated, the phase offset can be computed. The phase offset can be computed by determining the phase error vector represented by the I and Q output of the accumulator 808.

This serial correlator can be useful when the timing base for the training sequence has been established. In the described exemplary embodiment, the timing of the training sequence can be established by the differential correlator. The timing information can be used to initiate and terminate the accumulator 808 to minimize the computational complexity that might otherwise be required with the parallel coherent correlator.

Figure 9:
FIG. 9 is a functional block diagram of an exemplary forward error correction block.

FIG. 9 is a functional block diagram of an exemplary FEC block. In the described exemplary embodiment, the FEC block accepts demodulated baseband signals from the demodulator and provides an error corrected output to the HD Decoder. The exemplary FEC block includes an iterative decoder 902 positioned at the front end to decode the demodulated baseband signals. A Reed-Solomon decoder 906 can be used at the output of the iterative decoder 902 to compensate for the error floor limitation inherent in concatenated code algorithms.

Figure 10:
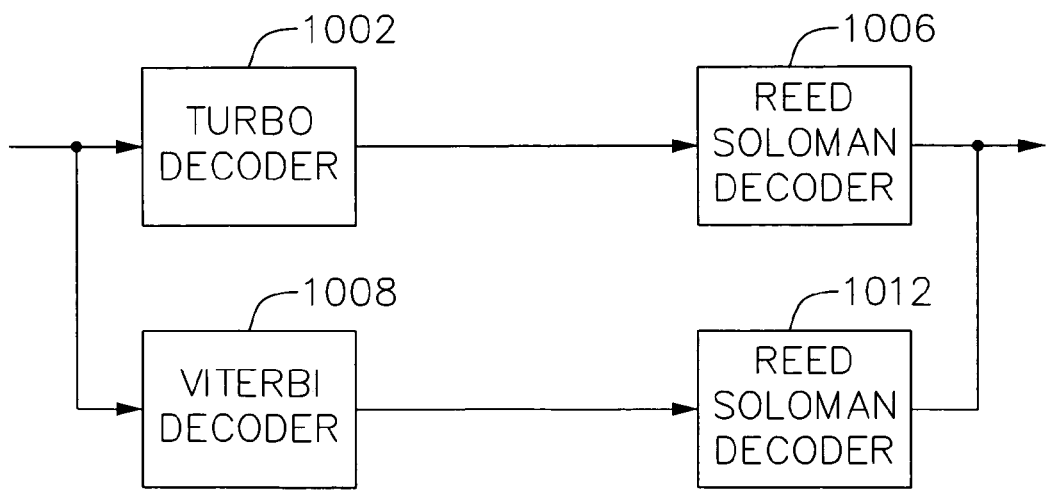
FIG. 10 is a functional block diagram of an alternative exemplary forward error correction block.

FIG. 10 is a functional block diagram of an alternative exemplary FEC block. This embodiment of the FEC block includes a viterbi decoder channel in parallel with the iterative decoder channel described in connection with FIG. 9. The iterative decoder channel includes a iterative decoder 1002 positioned at the input of the channel. The iterative decoder is coupled to a Reed-Solomon decoder 1006. The viterbi decoder channel includes a viterbi decoder 1008 at the input of the channel. The viterbi decoder output is coupled to a Reed-Solomon decoder 1012.

In this case, the demodulated baseband signals from the demodulator may be fed to either the iterative decoder 1002 or a viterbi decoder 1008 depending on the coding algorithm for the satellite transmission. The processor can be used to enable the iterative decoder channel or the viterbi decoder channel. The processor can be preprogrammed with the coding algorithm of the satellite transmission, or alternatively, the processor can determine the coding algorithm during the satellite transmission. By way of example, the framing protocol for the satellite transmission could include a coding field in the header indicating the coding algorithm for the payload. The processor could then read the code field using the symbol count to locate the code field and enable the appropriate decoder channel.

The various illustrative logical blocks, modules, and circuits described in connection with the embodiments disclosed herein may be implemented or performed in a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A satellite receiver, comprising:
   at least one data memory for storing coefficient values generated in accordance with at least one training sequence;
   a demodulator configured to demodulate a signal, the demodulator comprising at least one correlator for generating at least one peak correlation value in accordance with the signal and the coefficient values, the demodulator configured to adjust frequency, symbol timing and phase of the signal in accordance with the at least one peak correlation value;
   an iterative decoder coupled to the demodulator; and
   a second decoder parallel to the iterative decoder coupled to the demodulator, wherein the signal is routed between the iterative decoder and the second decoder based on a coding algorithm of a satellite transmission received by the satellite receiver.

2. The satellite receiver of claim 1 wherein the demodulator comprises a carrier frequency recovery loop configured to track a frequency offset for a signal input to the demodulator.

3. The satellite receiver of claim 2 wherein the demodulator further comprises a multiplier configured to multiply the signal with the frequency offset tracked by the carrier frequency recovery loop.

4. The satellite receiver of claim 2 further comprising a processor configured to compute the frequency offset and load the computed frequency offset into the carrier frequency recovery loop.

5. The satellite receiver of claim 4 wherein the processor comprises a differential correlator configured to compute the frequency offset.

6. The satellite receiver of claim 1 further comprising a processor configured to recover a symbol clock from a signal input to the demodulator.

7. The satellite receiver of claim 6 wherein the demodulator comprises a symbol timing recovery loop configured to track the recovered symbol clock.

8. The satellite receiver of claim 7 wherein the demodulator further comprises a resampler configured to resample the signal with the tracked symbol clock from the symbol timing recovery loop.

9. The satellite receiver of claim 1 wherein the demodulator comprises a phase recovery loop configured to track a phase offset for a signal input to the demodulator.

10. The satellite receiver of claim 9 wherein the demodulator further comprises a multiplier configured to multiply the signal with the phase offset tracked by the phase recovery loop.

11. The satellite receiver of claim 10 further comprising a processor configured to compute the phase offset and load the computed phase offset into the phase recovery loop.

12. The satellite receiver of claim 11 wherein the processor comprises a coherent correlator configured to compute the phase offset.

13. The satellite receiver of claim 1 wherein the second decoder comprises a viterbi decoder.

14. A method of receiving a modulated concatenated encoded signal, comprising:
generating coefficient values in accordance with at least one training sequence; demodulating the signal comprising:
generating at least one peak correlation value in accordance with the signal and the coefficient values; and
adjusting frequency, symbol timing and phase of the signal in accordance with the at least one peak correlation value; and
routing the signal between an iterative decoder or a non-iterative decoder based on a coding algorithm of a satellite transmission, the non-iterative decoder being coupled in parallel to the iterative decoder.

15. The method of claim 14 wherein the signal demodulation comprises tracking a frequency offset of the signal.

16. The method of claim 15 wherein the signal demodulation further comprises multiplying the signal with the tracked frequency offset.

17. The method of claim 14 further comprising computing a frequency offset of the signal.

18. The method of claim 17 wherein the frequency offset computation comprises computing a plurality of phase differentials from a training sequence embedded in the signal, and correlating the computed phase differentials with a plurality of coefficients.

19. The method of claim 18 wherein the frequency offset computation further comprises computing a frequency error vector as a function of the correlation.

20. The method of claim 18 wherein the phase offset computation further comprises computing a phase error vector as a function of the correlation.

21. The method of claim 14 wherein the signal demodulation comprises recovering a symbol clock from the signal.

22. The method of claim 21 wherein the signal demodulation further comprises resampling the signal with the recovered symbol clock.

23. The method of claim 21 wherein the symbol clock recovery comprises computing a plurality of phase differentials from a training sequence embedded in the signal, and correlating the computed phase differentials with a plurality of coefficients.

24. The method of claim 23 wherein the symbol clock recovery comprises determining a distance in time between at least two correlations, the symbol clock recovery being a function of the distance determination.

25. The method of claim 14 wherein the signal demodulation comprises tracking a phase offset of the signal.

26. The method of claim 25 wherein the signal demodulation further comprises multiplying the signal with the tracked phase offset.

27. The method of claim 25 further comprising computing a phase offset of the signal.

28. The method of claim 27 wherein the phase offset computation comprises correlating a training sequence embedded in the signal with a plurality of coefficients.

29. An integrated circuit, comprising: a demodulator configured to demodulate a signal, the demodulator comprising:
a carrier frequency recovery loop configured to track a frequency offset for the signal, the carrier frequency recovery loop comprising a multiplier configured to multiply the signal with the frequency offset tracked by the carrier frequency recovery loop;
a symbol timing recovery loop configured to track a symbol clock recovered from the signal, the symbol timing recovery loop comprising a variable interpolator decimator configured to resample the signal with the tracked symbol clock; and
a phase recovery loop configured to track a phase offset for the signal, the phase recovery loop comprising a mixer configured to multiply the signal with the phase offset tracked by the phase recovery loop; and
an iterative decoder coupled to the demodulator.

30. The integrated circuit of claim 29 further comprising at least one processor configured to compute the frequency offset and load the computed frequency offset into the carrier frequency recovery loop.

31. The integrated circuit of claim 30 wherein the at least one processor is configured to compute the phase offset and load the computed phase offset into the phase recovery loop.

32. The integrated circuit of claim 31 wherein the at least one processor comprises a coherent correlator configured to compute the phase offset.

33. The integrated circuit of claim 30 wherein the at least one processor comprises a differential correlator configured to compute the frequency offset.

34. The integrated circuit of claim 29 further comprising a processor configured to compute the phase offset and load the computed phase offset into the phase recovery loop.

35. The integrated circuit of claim 34 wherein the processor comprises a coherent correlator configured to compute the phase offset.

36. The integrated circuit of claim 29 further comprising a second decoder different from the iterative decoder coupled to the demodulator.

37. The integrated circuit of claim 36 wherein the second decoder comprises a viterbi decoder.

38. The integrated circuit of claim 37 wherein the demodulated signal is either provided to the iterative decoder or to the second decoder.

39. The integrated circuit of claim 29 further comprising a feed forward equalizer coupled to receive a signal processed by the variable interpolator decimator.

40. The integrated circuit of claim 39 further comprising a decimation filter coupled to receive an output of the multiplier.

41. The integrated circuit of claim 40 further comprising a Nyquist filter coupled to receive an output of the variable interpolator decimator.

42. The integrated circuit of claim 29 comprising at least one correlator for generating at least one peak correlation value in accordance with the signal and coefficient values generated in accordance with at least one training sequence, the demodulator configured to adjust at least one of frequency, symbol timing and phase of the signal in accordance with the at least one peak correlation value.

* * * * *